C. H. KRAPF.
ADJUSTABLE AND RELEASING GUARD FOR SLICING KNIVES.
APPLICATION FILED OCT. 18, 1919.

1,342,292.

Patented June 1, 1920.

WITNESSES

INVENTOR
Charles H. Krapf.
BY
ATTORNEYS

UNITED STATES PATENT OFFICE.

CHARLES H. KRAPF, OF BROOKLYN, NEW YORK.

ADJUSTABLE AND RELEASING GUARD FOR SLICING-KNIVES.

1,342,292. Specification of Letters Patent. Patented June 1, 1920.

Application filed October 18, 1919. Serial No. 331,623.

*To all whom it may concern:*

Be it known that I, CHARLES H. KRAPF, a citizen of the United States, and a resident of the city of New York, borough of Brooklyn, in the county of Kings and State of New York, have invented a new and Improved Adjustable and Releasing Guard for Slicing-Knives, of which the following is a full, clear, and exact description.

The invention relates to slicing knives such as shown and described in the Letters Patent of the United States, No. 1,305,906, granted to me on June 3, 1919.

The object of the present invention is to provide a new and improved adjustable and releasing guard for a slicing knife arranged to permit the user to cut slices of bread, meat, vegetables and the like of any desired thickness and to readily release the slice at the option of the user.

Another object is to enable the user to remove the cut slice and deposit it in another place or deliver it to another person without touching the slice.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1:
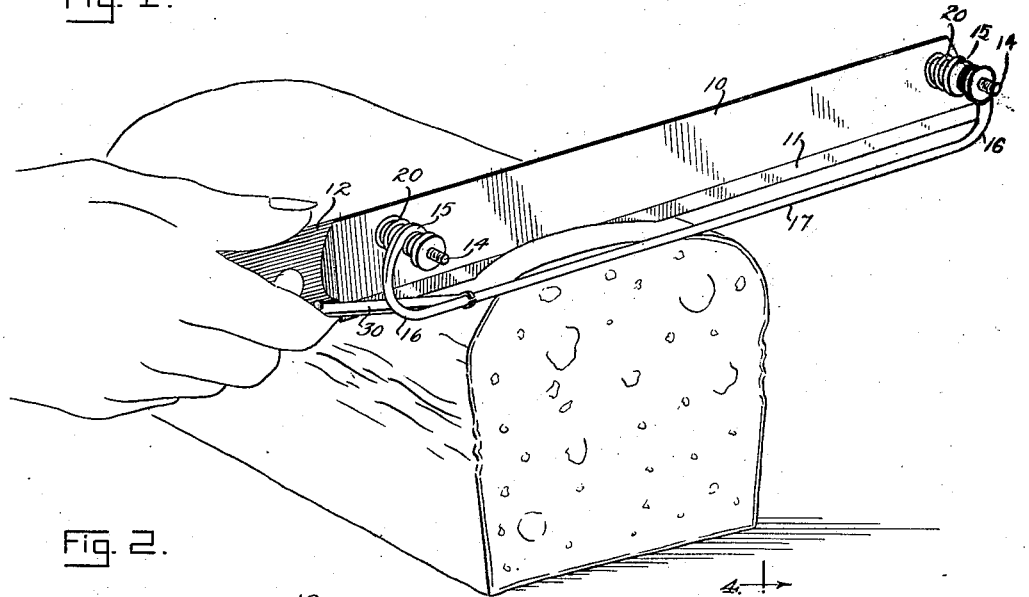
Figure 1 is a perspective view of the adjustable slicing knife as applied.
Figure 2:
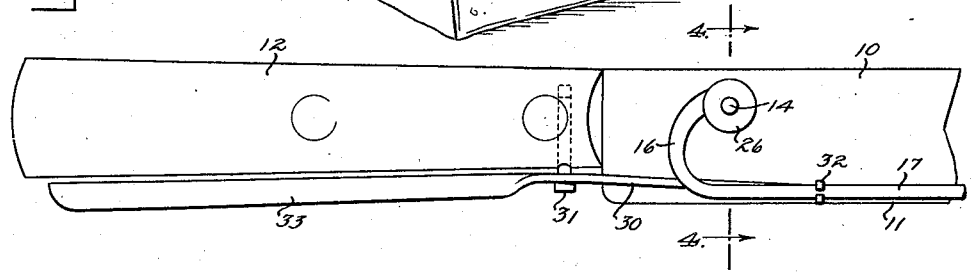
Fig. 2 is a side elevation of the handle end of the adjustable slicing knife.
Figure 3:
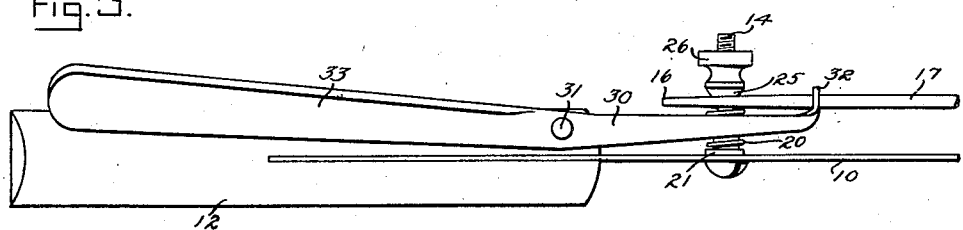
Fig. 3 is an inverted plan view of the same.

The slicing knife comprises in its general construction, a knife blade 10 provided with the usual cutting edge 11 and with a handle 12 adapted to be taken hold of by the user for manipulating the knife when cutting a slice from a loaf of bread or other article. The knife blade 10 is provided near the front and rear ends with bolts 14 engaged by flat eyes 15 formed on the curved end 16 of a gage rod 17 arranged parallel to the knife blade 10 and located to one side of the cutting edge 11, as plainly shown in the drawings. The rear faces of the eyes 15 are pressed on by springs 20 coiled around the bolts 14 and seated at the rear ends on the fastening or locking nuts 21 used for fastening the bolts 14 in position on the blade 10. The front faces of the eyes 15 are engaged by the conical inner ends 25 of nuts 26 screwing on the bolts 14 to hold the gage rod 17 in parallel relation to the cutting edge 11 of the knife blade 10. It is understood that by adjusting the nuts 26, the gage rod 17 can be readily adjusted to the cutting edge 11 to cut slices of a desired thickness.

It will be noticed that when the slice is cut off it is held clamped between the blade 10 and the gage rod 17, and in order to readily release the slice whenever it is desired to do so use is made of releasing means connected with the gage rod 17. The releasing means consist of a lever 30 mounted to swing on the lower end of an upright pivot 31 attached to the under side of the handle 12 adjacent the rear end of the knife blade 10, and the forward end of this lever 30 is provided with an eye 32 engaging the gage rod 17. The lever 30 terminates at its rear end in a handle 33 adapted to be pressed inward by the operator's fingers having hold of the handle 12 to swing the lever 30 outwardly and thus cause the gage rod 17 to swing in an outward direction, that is, away from the cutting edge 11, to release the slice held between the knife blade 10 and the gage rod 17. It is understood that the gage rod 17 swings on the bolts 14 as a fulcrum (see Fig. 4) and hence on actuating the lever 30, the gage rod swings outward into releasing position. It will be noticed that when the gage rod 17 is swung outward, pressure is exerted by the flat eyes against the springs 20, and when the handle 33 of the lever 30 is released, the gage rod 17 returns to normal position by the action of the springs 20 on the flat eyes 15 of the gage rod.

Figure 4:
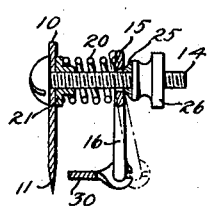
Fig. 4 is a cross section of the same on the line 4—4 of Fig. 2.

By reference to Fig. 4 it will be noticed that the conical inner ends 25 of the nuts 26 permit the eyes 15 to readily move into an angular position on the operator pressing the handle 33 of the lever 30, as above explained.

It is understood that after the user of the knife has cut off the slice, the latter remains clamped between the blade 10 and the gage rod 17 and hence the operator can readily move the slice to a plate or other support or hand it to another person without touching the slice, and when it is desired to release the slice, the operator needs only to press the handle 33 to swing the gage rod 17 outward, as above explained.

Having thus described my invention, I claim as new and desire to secure by Letters Patent:—

1. An adjustable slicing knife, comprising in combination a handled knife blade, a gage rod disposed parallel to one side of the cutting edge of the knife blade, adjustable means engaged by the ends of the gage rod to hold the latter in place on the said knife blade, and manually controlled releasing means mounted on the knife and engaging the said gage rod to move the latter from normal gaging position outwardly into releasing position to release the slice held between the knife blade and the gage rod.

2. An adjustable slicing knife, comprising in combination a handled knife blade, a gage rod disposed parallel to one side of the cutting edge of the knife blade, adjustable means engaged by the ends of the gage rod to hold the latter in place on the said knife blade, and a manually controlled releasing lever fulcrumed on the handle of the knife and having its forward end engaging the said gage rod, the rear end of the said lever being in the form of a handle arranged alongside the knife handle.

3. An adjustable slicing knife comprising in combination a handled knife blade, bolts projecting from the front face of the knife blade, a gage rod disposed parallel to the front face of the knife blade and mounted to swing from and toward the said front face of the knife blade, springs on the bolt and pressing the said gage rod to normally hold the same in innermost gaging position, and a manually controlled releasing lever fulcrumed on the handle of the knife and having its forward end connected with the said gage rod to swing the latter from normal gaging position outwardly into releasing position to release a slice held between the knife blade and the gage rod.

CHARLES H. KRAPF.